UNITED STATES PATENT OFFICE.

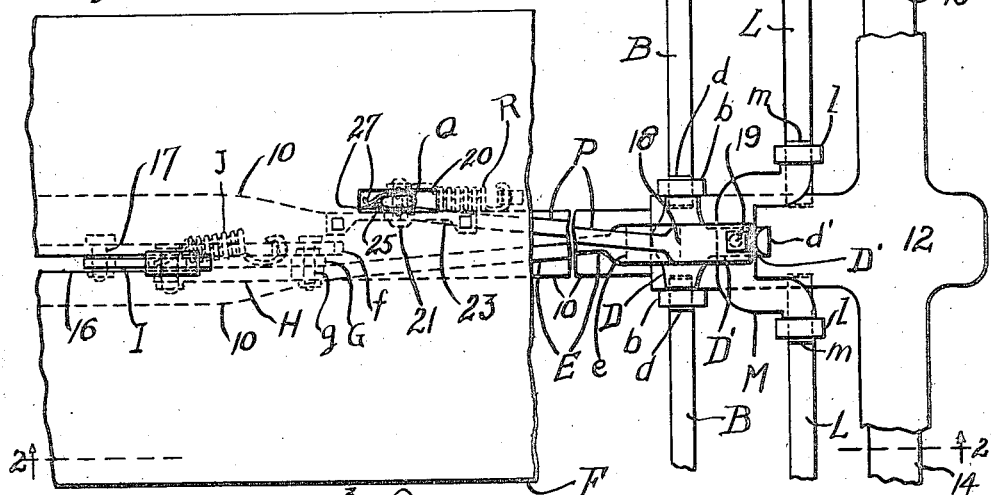

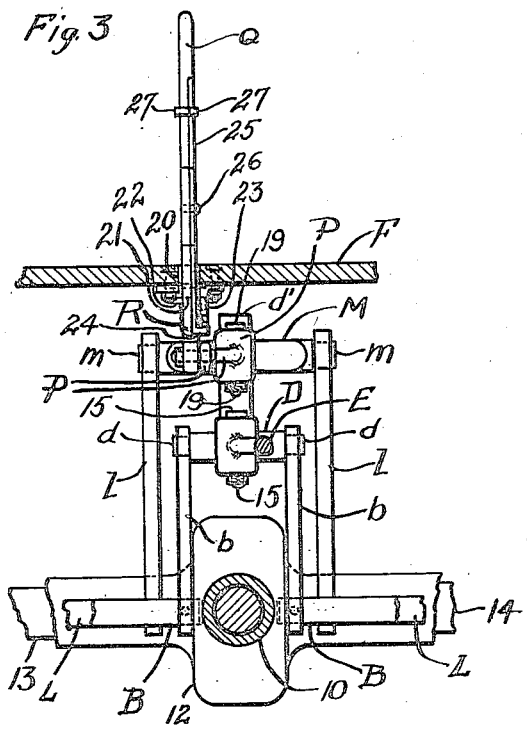
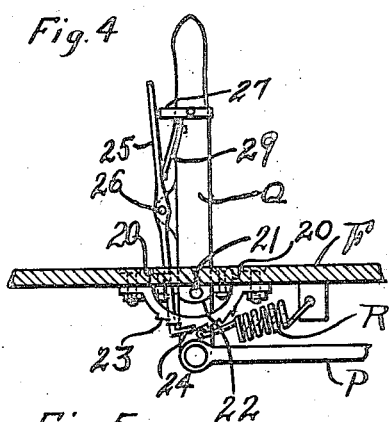
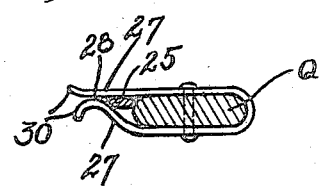
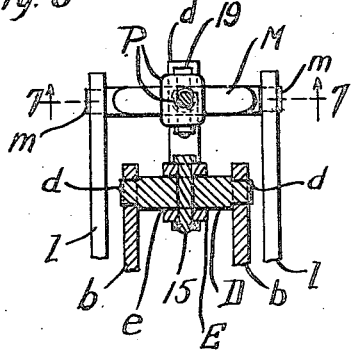
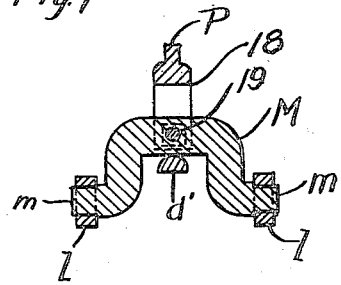

HENRY JOSEPHSON, OF CLEVELAND, OHIO.

BRAKE-SHAFT-OPERATING MECHANISM FOR AUTOMOBILES.

1,227,797.  Specification of Letters Patent.  Patented May 29, 1917.

Application filed December 18, 1916. Serial No. 137,558.

*To all whom it may concern:*

Be it known that I, HENRY JOSEPHSON, a citizen of the United States of America, residing at Cleveland, in the county of Cuyahoga and State of Ohio, have invented certain new and useful Improvements in Brake-Shaft-Operating Mechanism for Automobiles; and I hereby declare the following to be a full, clear, and exact description of the invention, such as will enable others skilled in the art to which it pertains to make and use the same.

This invention relates to improvements in brake-shaft-operating mechanism for automobiles, and pertains more especially to improved brake-operating mechanism comprising the following:—a pair of brake-operating rock-shafts which are arranged transversely of the automobile and substantially in line endwise and each provided at its inner end with an arm, the arms projecting in the same direction, an equalizing bar extending between and connecting together said arms and adapted to be actuated in the direction required to effect the brake-applying movement of said shafts by a hand-lever which is operatively connected with said bar and normally movable with the bar during the actuation of the bar in said direction by means other than said hand-lever, locking means adapted to be employed in locking said hand-lever against movement in the opposite direction upon said actuation of said bar and normally inoperative, another pair of brake-operating rock-shafts which are arranged transversely of the automobile and substantially in line endwise and each provided at its inner end with an arm, the arms projecting in the same direction, an equalizing bar extending between and connecting together the arms of the second-mentioned shafts, a foot-lever operatively connected with the second-mentioned equalizing bar for effecting the actuation of said bar in the direction required to effect the brake-applying movement of the second-mentioned shafts, means acting to actuate the second-mentioned equalizing bar in the opposite direction upon the aforesaid actuation of said bar by the foot-lever, means independent of the hand-lever for effecting the aforesaid actuation of the first-mentioned equalizing bar simultaneously with and during said actuation of the second-mentioned equalizing bar by the foot-lever, and means acting to effect the return movement of the first-mentioned equalizing bar upon the aforesaid actuation of said bar.

One object of this invention is to enable the chauffeur or operator to have one hand always on the steering-wheel of the automobile, and to have his other hand free, if desired, for signaling, while effecting the actuation from a foot-lever of all of the hereinbefore mentioned brake-operating shafts simultaneously in the direction required to effect the brake-applying movement of the shafts.

Another object is not only to have at least one brake-operating shaft at all times in operative connection with a foot-lever, and to have at least one other brake-operating shaft free to be operated to effect its brake-applying movement by motion transmitted thereto from a hand-lever independently of the shaft referred to as continuously in operative connection with the foot-lever, but to provide means for effecting the brake-applying movement of the last-mentioned shaft simultaneously with and during the actuation of the foot-lever in the direction required to effect the brake applying movement of the aforesaid shaft referred to as at all times in operative connection with the foot-lever.

Another object is not only to have the hereinbefore mentioned arms of one of the hereinbefore mentioned pairs of shafts connected together by an equalizing bar operatively connected with a foot-lever for actuating said bar in the direction required to effect the brake-applying movement of said shafts, and to have the arms of the other of said pairs of shafts connected together by an equalizing bar operatively connected with a hand-lever for actuating said bar independently of the first-mentioned bar and in the direction required to effect the brake-applying movement of the last-mentioned shafts, but to provide means whereby the last-mentioned bar is actuated in said direction during the aforesaid actuation of the first-mentioned bar, so that all of the brake-operating shafts are simultaneously operated in the direction required to effect the application of all the brakes operatively connected with said shafts.

Another object is to provide simple and reliable brake-shaft-operating mechanism in which an equalizing bar connecting together the arms of certain brake-operating rock-shafts, which are free to be rocked independently in the direction required to effect the brake-applying movement of said shafts, is positively actuated in the direction required to effect said movement of said shafts simultaneously with and during the rocking of other shafts in the direction required to effect the brake-applying movement of the last-mentioned shafts by the required actuation of another equalizing bar connecting together arms of said last-mentioned shafts.

Another object is to provide the equalizing bar carried by the arms of the shafts of one of the hereinbefore mentioned pairs of shafts with an arm arranged centrally between the ends of said bar and terminating in a projecting member arranged at and in contact with the central portion of the equalizing bar carried by the arms of the other of said pairs of shafts and kept in proper contact with the last-mentioned equalizing bar regardless of any stress or strain tending to disturb the parallelism of said pairs of shafts.

Another object is not only to simultaneously effect the brake-applying movements of all of the brake-operating shafts by the actuation of a single foot-lever, but to require only the release of said foot-lever to render said shafts releasable simultaneously and instantly upon their brake-applying movement and thereby attain the benefits of an instantaneous release of all the brakes.

With these objects in view, this invention consists in certain features of construction, and combinations and relative arrangement of parts, hereinafter described in this specification, pointed out in the claims, and illustrated in the accompanying drawings.

In said drawings, Figure 1 is a top plan of brake-shaft-operating mechanism embodying my invention. Fig. 2 is a side view in vertical section taken along the line 2—2, Fig. 1. Fig. 3 is a transverse vertical section taken along the line 3—3, Fig. 2, looking rearwardly. Fig. 4 is a view showing a portion of Fig. 2, but in Fig. 2 the pawl carried by the hand-lever is shown in an inoperative position, whereas in Fig. 4 said pawl is shown in its rack-engaging position. Fig. 5 is a horizontal section taken along the line 5—5, Fig. 2. Fig. 6 is a vertical section taken along the line 6—6, Fig. 2, looking rearwardly. Fig. 7 is a horizontal section taken along the line 7—7, Fig. 6, looking upwardly. Portions are broken away in the drawings to reduce their size and to more clearly show the construction.

Referring to said drawings, 10 indicates the suitably supported transmission case of an automobile, which case is employed in housing means for transmitting motion to gearing (not shown) housed in a case 12 which is rigid with the case 10 and affords bearing to the two sections 13 and 14 of the rear axle of the automobile which are arranged in line endwise and driven in the usual manner. Means for transmitting motion to said axle-sections and the manner of applying said axle-sections are too well known in the art to require description and illustration thereof in detail in this specification, nor is it considered necessary in this specification to describe and illustrate the application to said axle-sections of well-known types of brakes. Suffice it to state that a suitable distance forwardly of each of said axle-sections is a pair of substantially horizontal rock-shafts B which are arranged forwardly of and substantially parallel with the axle-sections 13 and 14 respectively, and that said shafts are consequently arranged transversely of the automobile and substantially in line endwise and preferably supported at their adjacent or inner ends from the case 12. I would here remark that the shafts B are rotated in a forward direction to transmit power for operating brakes (not shown) for the axle-sections. Each of the shafts B is provided at its inner end with an upwardly projecting arm $b$, and an equalizing bar D extends horizontally between the upper portions of and is supported from the arms $b$ of the shafts B. Preferably said bar D terminates at each end in a journal or pivotal member $d$ which has bearing in the adjacent shaft-arm $b$, and said bar has its pivotal members $d$ substantially parallel with the shafts B.

The bar D (see Figs. 2 and 6) extends through a slot $e$ formed in and extending laterally through and to the outer extremity of the rear end-portion of a rod E extending longitudinally of the automobile, and said end-portion of said rod is pivoted vertically, as at 15, to said bar centrally between the ends of the bar and consequently centrally between the arms $b$ of the shafts B. Said rod extends forwardly from the bar D and at its forward end is operatively connected with the lower end of an upright lever G which is fulcrumed at its upper end, as at $g$, to a member $f$, rigid with and depending from the foot-board F of the automobile. The lever G is operatively connected centrally between its ends by a link H with a foot-lever I which extends in the usual manner through a slot 16 in the foot-board F and is fulcrumed, as at 17, to the case 10. A spiral spring J, connected at one end to the foot-lever I and at its other end to the supporting member $f$, acts to retain said foot-lever in its normal position, and the shaft-arms $b$ connected with said foot-lever are arranged substantially vertically in said position of said lever as shown. It will be observed therefore that the arms b of the shafts B are operatively connected through the medium of the equalizing bar D, the rod E, the lever G and the link H with a foot-lever I and it is understood that a rocking or rotation of the shafts B by the forward actuation of the foot-lever is the brake-applying movement of said shafts.

Intermediately of each shaft B and the adjacent axle-section is a substantially horizontal rock-shaft L which is substantially parallel with said axle-section and with said shaft B. The rearward rock-shafts L are arranged transversely of the automobile and substantially in line endwise and preferably supported at their adjacent or inner ends from the case 12, and I would here remark that said rearward shafts are rocked or rotated in a forward direction to transmit power for operating brakes (not shown) for the axle-sections. Each of the shafts L is provided at its inner end with an upwardly projecting arm $l$, and an equalizing bar M extends horizontally between the upper portions of and is supported from the arms $l$ of the shafts L and has its central portion offset forwardly as shown in Fig. 1. Each end-portion of said bar terminates in a journal or pivotal member $m$ which has bearing in the adjacent shaft-arm $l$, and said bar has its pivotal members $m$ substantially parallel with the shafts L.

The bar M (see Figs. 2 and 7) extends through a slot 18 formed in and extending laterally through and to the outer extremity of the rear end-portion of a rod P extending longitudinally of the automobile, and said end-portion of said rod is pivoted vertically, as at 19, to said portion of said bar centrally between the ends of the bar. The rod P extends forwardly from the bar M and at its forward end is operatively connected with the lower end of an upright hand-lever Q which extends through a slot 20 in the foot-board F and is fulcrumed, as at 21, to a bracket 22 secured to said foot-board. A spiral spring R, connected at one end to the hand-lever Q and at its opposite end to the foot-board F acts to retain said lever in its normal position, and the shaft-arms $l$ connected to said lever are arranged substantially vertically in said position of said lever as shown. It will be observed therefore that the arms $l$ of the shafts L are operatively connected through the medium of the equalizing bar M and the rod E with the hand-lever Q, and it is understood that a rocking or rotation of the shafts L by the forward actuation of the shaft-arms $l$ is the brake-applying movement of said shafts.

The equalizing bar D is provided centrally between its ends, and consequently centrally between the arms $b$ of the forward shafts B, with a rearwardly projecting arm D' which terminates in an upwardly projecting member $d'$ which extends transversely of the rear side of the central portion of the equalizing bar M and is in contact at its forward side with said side of said portion of the last-mentioned bar centrally between the ends of said last-mentioned bar and consequently centrally between the arms $l$ of the rearward shafts L. The upwardly projecting member $d'$ of the arm $d'$ is not only shown in contact with the central portion of the bar M but as extending between the end-portions of said bar as shown in Figs. 1 and 7, so that said end-portions operate to limit displacement of said upwardly projecting member endwise of said central portion of said bar.

It will be observed that the equalizing bar M is free, so far as the upwardly projecting member $d'$ of the arm D' of the equalizing bar D is concerned, to be pulled forwardly independently of the engaging member $d'$ of said arm D', so that the actuation of the hand-lever Q in the direction required to pull the equalizing bar M forwardly and against the action of the spring R results in effecting the brake-applying movement of the rearward brake-operating shafts B. It will be observed however, that the forward actuation of the foot-lever I not only results in effecting the brake-applying movement of the forward shafts B, but in the forward actuation of the equalizing bar D carried by the arms $b$ of said shafts so that the arms $l$ of the rearward shafts are at once and positively actuated forwardly through the medium of the member $d'$ of the arm D' of the equalizing bar D of the arms $b$ of the forward shafts and the central portion of the equalizing bar M carried by the arms $l$ of the rearward shafts, as required to effect the brake-applying movement of said rearward shafts. It will be observed therefore that by the construction hereinbefore described the arms $l$ of the rearward brake-operating shafts are connected together at their upper ends by an equalizing bar M; that the arms $b$ of the forward operating shafts are connected together at their upper ends by an equalizing bar D; that the member $d'$ of the arm D' of the last-mentioned bar and the central portion of the equalizing bar M connected to the arms $l$ of the rearward shafts have such relative arrangement that the brake-applying movements of both the forward and rearward shafts are simultaneously effected by and during the forward actuation of the foot-lever I, and that the last-mentioned bar, and consequently the arms $l$ of the rearward shafts, are adapted to be actuated forwardly independently of the member $d'$ of the arm D' of the equalizing bar D connecting together the arms $b$ of the forward shafts. Hence the brake-applying movement of the rearward shafts may be effected independently of the forward shafts by the actuation of the hand-lever Q against the action of the spring, R. It will be understood therefore that brakes (not shown) operatively connected with the rearward shafts L may be applied by the required operation of said shafts through the medium of the hand-lever Q, that said brakes are applied simultaneously with the application of other brakes (not shown) only adapted to be applied by the required operation of the forward shafts B through the medium of the foot-lever I, that the shafts B and L constitute all the brake-operating shafts of an automobile, and that therefore all the brakes of the automobile are simultaneously applied by actuating the foot-lever I in the direction required to effect the brake-applying movement of all of said shafts.

At the under side of the foot-board F is a segmental rack 23 which is shown secured to said foot-board and arranged at one side of the hand-lever Q below the fulcrum of the lever. The rack 23 extends of course circumferentially of the fulcrum 21 of said hand-lever and has its teeth formed at its under side. A pawl 24 is normally out of engagement with the rack 23, as shown in Fig. 2, but arranged to be moved into an interdental space of said rack, as shown in Fig. 4, and has an arm 25 which extends upwardly through the slot 20 in the foot-board F. The pawl-arm 25 is pivoted, as at 26, above said foot-board and centrally between its ends, to the lever Q horizontally and parallelly with the axis of said lever. In the normal position of the pawl the arm 25 extends, as shown in Figs. 1 and 5, between two oppositely arranged resilient arms or members 27 with which the lever Q is provided above the axis of the pawl-arm 25 and which (see Fig. 5) are substantially in contact with each other, as at 28, forwardly of said arm, and are arranged to normally retain said arm in the position required to hold the pawl 24 out of engagement with the rack 23 against the action of a spring 29 which (see Figs. 2 and 4) is arranged between the pawl-arm 25 and the lever Q above the axis of said arm and supported from said lever, and obviously said spring 29, upon actuating the pawl-arm forwardly from between the resilient members 27 of said lever, actuates said arm into the position required to bring the pawl into engagement with the rack, as shown in Fig. 4. The forward end-portions of the resilient members 27 of the lever Q diverge forwardly as at 30, Fig. 2, to guide the pawl-arm 25 during its movement from the position shown in Fig. 4 into its normal position shown in Figs. 1 and 5.

By the construction hereinbefore described, it will be observed that forward movement of the equalizing bar M connected to the rearward shafts is against the action of the spring R which acts therefore to retain said bar and the connected shaft-arms $l$ in their rearward and normal position in which said bar is engaged at its rear side by the member $d'$ of the arm $D'$ of the equalizing bar D connected to the arms $b$ of the forward shafts B. Obviously the brake-applying movements of all the brake-operating shafts during the forward actuation of the last-mentioned bar connected to the foot-lever is assured at all times while the pawl 24 is in its normal and rack-disengaging and inoperative position shown in Fig. 1, and the chauffeur or operator of the automobile can, with one foot on the foot-lever, effect the brake-applying movement of all the brake-operating shafts and is enabled to keep one of his hands on the steering wheel and has his other hand free for signaling, and the ability to have one hand free for signaling in congested sections of cities will be recognized as invaluable in preventing automobile accidents.

The parallel relation of the two equalizing bars may sometimes be disturbed by stresses or strains to which an automobile is subjected, and therefore the member $d'$ of the arm $D'$ of the bar D has its forward side, which is arranged to engage the central portion of the bar M, curved forwardly or outwardly in cross-section, as shown in Figs. 1 and 7, so as to always insure a desirable contact between said member $d'$ and the bar M regardless of a temporary disturbance of the normal relative arrangement of said bars.

I would here remark that the normal and inoperative position of the pawl 24 is not disturbed unless it becomes necessary to stop the automobile on an incline, when of course the hand-lever Q is actuated against the action of the spring R as required to effect the brake-applying movement of the rearward brake-operating shafts independently of the forward shafts, whereupon the pawl-arm 25 is actuated forwardly of the resilient arms 27 of the hand-lever Q and into position to bring the pawl into engagement with the rack 23, as shown in Fig. 4, so as to lock said hand-lever against return movement.

What I claim is:—

1. In brake-shaft-operating mechanism for an automobile, two brake-operating rock-shafts arranged transversely of the automobile and substantially in line endwise and each having an arm, a foot-lever operatively connected with the arms of said shafts for effecting the brake-applying movement of the shafts, two other brake-operating rock-shafts arranged transversely of the automobile and substantially in line endwise and each having an arm and having their arms adapted to be actuated in the direction required to effect the brake-applying movement of said second-mentioned shafts independently of the first-mentioned shafts, a hand-lever operatively connected with said arms of the second-mentioned shafts, and means independent of the hand-lever for actuating the arms of the second-mentioned shafts in the aforesaid direction simultaneously with and during the brake-applying movement of the first-mentioned shafts by the foot-lever.

2. In brake-shaft-operating mechanism for an automobile, two brake-operating shafts arranged transversely of the automobile and each having an arm, a foot-lever operatively connected with the arms of said shafts for effecting the brake-applying movement of said shafts, two brake-operating shafts rearward of and substantially parallel with the first-mentioned and forward shafts and each provided with an arm and having their arms adapted to be actuated in the direction required to effect the brake-applying movement of said rearward shafts independently of the forward shafts, and means for actuating the arms of the rearward shafts in the aforesaid direction simultaneously with and during the brake-applying movement of the forward shafts by the foot-lever.

3. In brake-shaft-operating mechanism for an automobile, the combination, with a brake-operating rock-shaft having an arm, a foot-lever operatively connected with said arm for effecting the brake-applying movement of said shaft, another brake-operating rock-shaft having an arm adapted to be actuated in the direction required to effect the brake-applying movement of the second-mentioned shaft independently of the first-mentioned shaft, a hand-lever operatively connected and normally movable with the arm of the second-mentioned shaft for effecting the actuation of said arm in said direction, and locking means for locking the hand-lever against movement in the opposite direction upon said actuation of the arm of the second-mentioned shaft, said locking means being normally inoperative, of means acting, upon the actuation of the foot-lever in the direction required to effect the brake-applying movement of the first-mentioned shaft, to actuate the foot-lever in the opposite direction; means independent of the hand-lever for effecting the aforesaid brake-applying movement of the second-mentioned shaft simultaneously with and during the brake-applying movement of the first-mentioned shaft, and means acting, upon the actuation of the hand-lever in the direction required to effect the brake-applying movement of the second-mentioned shaft, to actuate said lever in the opposite direction.

4. In brake-shaft-operating mechanism for an automobile, two brake-operating shafts arranged transversely of the automobile and each having an upwardly projecting arm, a foot-lever operatively connected with the arms of said shafts for actuating said arms forwardly and thereby effecting the brake-applying movement of said shafts, two brake-operating shafts rearward of and substantially parallel with the first-mentioned and forward shafts and each provided with an upwardly projecting arm and having their arms adapted to be actuated forwardly independently of the arms of the forward shafts, a hand-lever operatively connected with the arms of the rearward shafts for actuating said arms forwardly, means independent of the hand-lever for actuating the arms of the rearward shafts forwardly simultaneously with and during the forward actuation of the arms of the forward shafts by the foot-lever, means acting to retain the arms of the forward shafts in their rearwardly actuated position, and means acting to retain the arms of the rearward shafts in their rearwardly actuated position.

5. In brake-shaft-operating mechanism for an automobile, two brake-operating shafts which are substantially in line endwise and each provided at its inner end with an arm and having their arms projecting in the same direction, an equalizing bar extending between and connecting together said arms, a hand-lever operatively connected with and spaced forwardly from said bar, two other brake-operating shafts having each an arm, a foot-lever operatively connected with the arms of the second-mentioned shafts for effecting the brake-applying movement of said second-mentioned shafts, and means whereby the aforesaid equalizing bar is actuated in the direction required to effect the brake-applying movement of the first-mentioned shafts during the brake-applying movement of the second-mentioned shafts by the foot-lever.

6. In brake-shaft-operating mechanism for an automobile, two brake-operating shafts having each an arm, a foot-lever operatively connected with the arms of said shafts for effecting the actuation of said arms in the direction required to effect the brake-applying movement of said shafts, two other brake-operating shafts which are substantially in line endwise and each provided at its inner end with an arm and having their arms projecting in the same direction, an equalizing bar extending between and connecting together the arms of the second-mentioned shafts and adapted to be actuated in the direction required to effect the brake-applying movement of the second-mentioned shafts independently of the first-mentioned shafts, a hand-lever operatively connected with said bar for actuating the bar in said direction, resilient means acting, upon said actuation of said equalizing bar, to actuate the bar in the opposite direction, and means independent of the hand-lever for effecting said actuation of said bar, against the action of said resilient means, simultaneously with and during the aforesaid actuation of the arms of the first-mentioned shafts by the foot-lever.

7. In brake-shaft-operating mechanism for an automobile, two brake-operating shafts arranged transversely of the automobile and substantially in line endwise and provided each with an upwardly projecting arm, a foot-lever operatively connected with the arms of said shafts for actuating said arms forwardly and thereby effecting the brake-applying movement of the shafts, two brake-operating shafts rearward of and substantially parallel with the first-mentioned and forward shafts and arranged substantially in line endwise and provided each at its inner end with an upwardly projecting arm, an equalizing bar extending between and connecting together the arms of the rearward shafts and adapted to be actuated forwardly independently of the arms of the forward shafts, a hand-lever operatively connected with the arms of the rearward shafts, means acting to retain said bar in its rearward position, and means independent of the hand-lever for actuating said bar forwardly simultaneously with and during the forward actuation of the arms of the forward shafts by the foot-lever.

8. In brake-shaft-operating mechanism for an automobile, two brake-operating shafts arranged transversely of the automobile and each having an arm, a hand-lever operatively connected with and spaced forwardly from the arms of said shafts, two other brake-operating shafts which are arranged transversely of the automobile and substantially in line endwise and each provided at its inner end with an arm, an equalizing bar extending between and connecting together the arms of the second-mentioned shafts, a foot-lever operatively connected with and spaced forwardly from said bar, and means for transmitting motion from said bar to the arms of the first-mentioned shafts, the relative arrangement of the parts being such that said arms of the first-mentioned shafts are actuated in the direction required to effect the brake-applying movement of said shafts simultaneously with and during the actuation of the aforesaid equalizing bar in the direction required to effect the brake-applying movement of the second-mentioned shafts.

9. In brake-shaft-operating mechanism for an automobile, brake-operating shafts arranged transversely of the automobile and each provided with an arm, a hand-lever operatively connected with said bar for effecting actuation of said arms in the direction required to effect the brake-applying movement of said shafts, means acting upon said movement of said shafts to actuate said arms in the opposite direction, two other brake-operating shafts arranged transversely of the automobile and substantially in line endwise and each provided at its inner end with an arm and having their arms substantially parallel and projecting in the same direction, an equalizing bar extending between and connecting together the arms of the second-mentioned shafts, a foot-lever operatively connected with and spaced forwardly from said bar, and means whereby the actuation of said bar in the direction required to effect the brake-applying movement of the second-mentioned shafts results in the actuation of the arms of the first-mentioned shafts to effect the brake-applying movement of said first-mentioned shafts.

10. In brake-shaft-operating mechanism for an automobile, two brake-operating shafts arranged transversely of the automobile and substantially in line endwise and each provided at its inner end with an arm and having their arms projecting in the same direction, an equalizing bar extending between and connecting together said arms, two other brake-operating shafts arranged transversely of the automobile and substantially in line endwise and each provided at its inner end with an arm and having their arms projecting in the same direction, an equalizing bar extending between and connecting together the arms of the first-mentioned shafts, an equalizing bar extending between and connecting together the arms of the second-mentioned shafts, a foot-lever spaced forwardly from the second-mentioned bar, and a rod operatively connected at one end with said second-mentioned bar and at its other end with the foot-lever, and means for transmitting motion from said second-mentioned bar to the first-mentioned bar, the relative arrangement of the parts being such that both equalizing bars are actuated in the direction required to simultaneously effect the brake-applying movement of all the shafts during the actuation of the aforesaid rod endwise in the required direction.

11. In brake-shaft-operating mechanism for an automobile, two brake-operating shafts arranged transversely of the automobile and substantially in line endwise and each provided at its inner end with an arm and having their arms projecting in the same direction, an equalizing bar extending between and connecting together the arms of said shafts, two other brake-operating shafts substantially parallel with the first-mentioned shafts and arranged substantially in line endwise and each provided at its inner end with an arm and having their arms projecting in the same direction, an equalizing bar extending between and connecting together the arms of the second-mentioned shafts, a foot-lever spaced forwardly from the second-mentioned bar, and a rod operatively connected at one end with said foot-lever and at its other end with said second-mentioned bar, one of the equalizing bars having an arm which extends transversely of the other equalizing bar.

12. In brake-shaft-operating mechanism for an automobile, two brake-operating shafts arranged transversely of the automobile and substantially in line endwise and each provided at its inner end with an upwardly projecting arm, an equalizing bar extending between and connecting together the arms of said shafts, two brake-operating shafts forward of and substantially parallel with the first-mentioned and rearward shafts and arranged substantially in line endwise and each provided at its inner end with an upwardly projecting arm, an equalizing bar extending between and connecting together the arms of the forward shaft and provided centrally between its ends with a rearwardly projecting arm terminating in an upwardly projecting member which extends transversely of and is in contact with the rear side of the first-mentioned equalizing bar centrally between the ends of said first-mentioned bar, and a foot-lever operatively connected with and spaced forwardly from the second-mentioned equalizing bar.

13. In brake-shaft-operating mechanism for an automobile, the combination, with two pairs of brake-operating rock-shafts arranged transversely of the automobile, the shafts of each pair being substantially in line and spaced endwise and each provided at its inner end with an arm, the arms of the shafts of each pair projecting in the same direction, of an equalizing bar establishing operative connection between the arms of the shafts of one pair, an equalizing bar establishing operation connection between the arms of the shafts of the other pair, and a foot-lever operatively connected with one of said bars, one of the equalizing bars having an arm which is arranged transversely of and normally in contact with the other equalizing bar and has its side which engages the last-mentioned bar curving outwardly in cross-section.

14. In brake-shaft-operating mechanism for an automobile, the combination, with a brake-operating rock-shaft having an arm, a lever operatively connected with said arm for effecting the brake-applying movement of said shaft, another brake-operating rock-shaft having an arm adapted to be actuated in the direction required to effect the brake-applying movement of the second-mentioned shaft independently of the first-mentioned shaft, a lever operatively connected with the arm of the second-mentioned shaft for effecting the actuation of said arm in said direction, and locking means for locking the second-mentioned lever against movement in the opposite direction, of means acting, upon the actuation of the first-mentioned lever in the direction required to effect the brake-applying movement of the first-mentioned shaft, to actuate said first-mentioned lever in the opposite direction; means independent of the second-mentioned lever for effecting the aforesaid brake-applying movement of the second-mentioned shaft simultaneously with and during the brake-applying movement of the first-mentioned shaft, and means acting, upon the actuation of said second-mentioned lever in the direction required to effect the brake-applying movement of the second-mentioned shaft, to actuate said lever in the opposite direction.

15. In brake-shaft-operating mechanism for an automobile, two brake-operating shafts which are substantially in line endwise and each provided at its inner end with an arm and having their arms projecting in the same direction, an equalizing bar extending between and connecting together said arms, a lever operatively connected with said bar, another brake-operating shaft having an arm, a lever operatively connected with said arm of the second-mentioned shaft for effecting the brake-applying movement of said second-mentioned shaft, and means whereby the aforesaid equalizing bar is actuated in the direction required to effect the brake-applying movement of the first-mentioned shafts during the brake-applying movement of the second-mentioned shaft by the second-mentioned lever.

16. In brake-shaft-operating mechanism for an automobile, a brake-operating shaft having an arm, a lever operatively connected with said arm for effecting the actuation of said arm in the direction required to effect the brake-applying movement of said shaft, two brake-operating shafts which are substantially in line endwise and each provided at its inner end with an arm and having their arms projecting in the same direction, an equalizing bar extending between and connecting together the arms of the second-mentioned shafts and adapted to be actuated in the direction required to effect the brake-applying movement of said second-mentioned shafts independently of the first-mentioned shaft, a lever operatively connected with said bar for actuating the bar in said direction, resilient means acting, upon said actuating of said equalizing bar, to actuate the bar in the opposite direction, and means independent of the second-mentioned lever for effecting the actuation of said bar, against the action of said resilient means, simultaneously with and during the aforesaid actuation of the arm of the first-mentioned shaft by the first-mentioned lever.

17. In brake-shaft-operating mechanism for an automobile, a brake-operating shaft having an arm, a lever operatively connected with the arm of said shaft, two brake-operating shafts which are arranged transversely of the automobile and substantially in line endwise and each provided at its inner end with an arm, an equalizing bar extending between and connecting together the arms of the second-mentioned shafts, a lever operatively connected with said bar, and means for transmitting motion from said bar to the arm of the first-mentioned shaft, the relative arrangement of the parts being such that said arm of the first-mentioned shaft is actuated in the direction required to effect the brake-applying movement of said first-mentioned shaft simultaneously with and during the actuation of the aforesaid equalizing bar in the direction required to effect the brake-applying movement of the second-mentioned shafts.

18. In brake-shaft-operating mechanism for an automobile, a brake operating shaft having an arm, a lever operatively connected with said arm for effecting the actuation of said arm in the direction required to effect the brake-applying movement of said shaft, means acting upon said movement of said shaft to actuate said arm in the opposite direction, two brake-operating shafts which are arranged transversely of the automobile and substantially in line endwise and each provided at its inner end with an arm and having their arms projecting in the same direction, an equalizing bar extending between and connecting together the arms of the second mentioned shafts, a lever operatively connected with said bar, and means whereby the actuation of said bar in the direction required to effect the brake-applying movement of the second-mentioned shafts results in the actuation of the arm of the first-mentioned shaft to effect the brake-applying movement of said first-mentioned shaft.

19. In brake-shaft-operating mechanism for an automobile, the combination, with two pairs of brake-operating shafts arranged transversely of the automobile, the shafts of each pair being substantially in line endwise and each provided at its inner end with an arm, and the arms of the shafts of each pair projecting in the same direction, of an equalizing bar establishing operative connection between the arms of the shafts of one pair, an equalizing bar establishing operative connection between the arms of the shafts of the other pair, and means whereby movement of one equalizing bar in the direction required to actuate the shaft-arms connected together by said bar in the direction required to effect the brake-applying movement effects the movement of the other equalizing bar in the direction required to actuate the shaft-arms connected together by the last-mentioned bar in the direction required to effect the brake-applying movement of the shafts having the last-mentioned arms.

In testimony whereof, I sign the foregoing specification, in the presence of two witnesses.

HENRY JOSEPHSON.

Witnesses:
B. C. BROWN,
EMIL W. KRYZ.